US008675161B2

(12) United States Patent
Tanaka

(10) Patent No.: US 8,675,161 B2
(45) Date of Patent: Mar. 18, 2014

(54) LIQUID CRYSTAL DISPLAY DEVICE, METHOD OF MANUFACTURING THE LIQUID CRYSTAL DISPLAY DEVICE AND ELECTRONIC APPARATUS

(75) Inventor: Takaaki Tanaka, Toshima-ku (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 13/227,552

(22) Filed: Sep. 8, 2011

(65) Prior Publication Data

US 2012/0086898 A1 Apr. 12, 2012

(30) Foreign Application Priority Data

Oct. 8, 2010 (JP) ................................ 2010-228177

(51) Int. Cl.
*G02F 1/1337* (2006.01)
*G02F 1/1343* (2006.01)

(52) U.S. Cl.
USPC .......................................... 349/129; 349/143

(58) Field of Classification Search
USPC ................................. 349/129, 143
See application file for complete search history.

(56) References Cited

U.S. PATENT DOCUMENTS

| 7,440,067 B2 * | 10/2008 | Yun et al. ....................... 349/143 |
| 2008/0111963 A1 * | 5/2008 | Wu et al. ........................ 349/144 |
| 2010/0060813 A1 * | 3/2010 | Kawashima et al. ........... 349/39 |

FOREIGN PATENT DOCUMENTS

| JP | 2009-168924 A | 7/2009 |
| JP | 2010-026274 A | 2/2010 |

* cited by examiner

*Primary Examiner* — Michael Caley
*Assistant Examiner* — Kendrick Hsu
(74) *Attorney, Agent, or Firm* — ALG Intellectual Property, LLC

(57) ABSTRACT

A substrate of a liquid crystal display device includes a first pixel electrode, a second pixel electrode adjacent to the first pixel electrode in a first direction, a third pixel electrode adjacent to the first pixel electrode in a second direction intersecting the first direction, a first alignment film provided in a first gap between the first pixel electrode and the second pixel electrode to align the liquid crystal molecules in the liquid crystal layer along the second direction, a second alignment film provided in a second gap between the first pixel electrode and the third pixel electrode to align the liquid crystal molecules in the liquid crystal layer along the first direction, and a third alignment film provided in the first gap and the second gap while covering the pixel electrodes to align the liquid crystal molecules along a normal of the substrate.

6 Claims, 10 Drawing Sheets

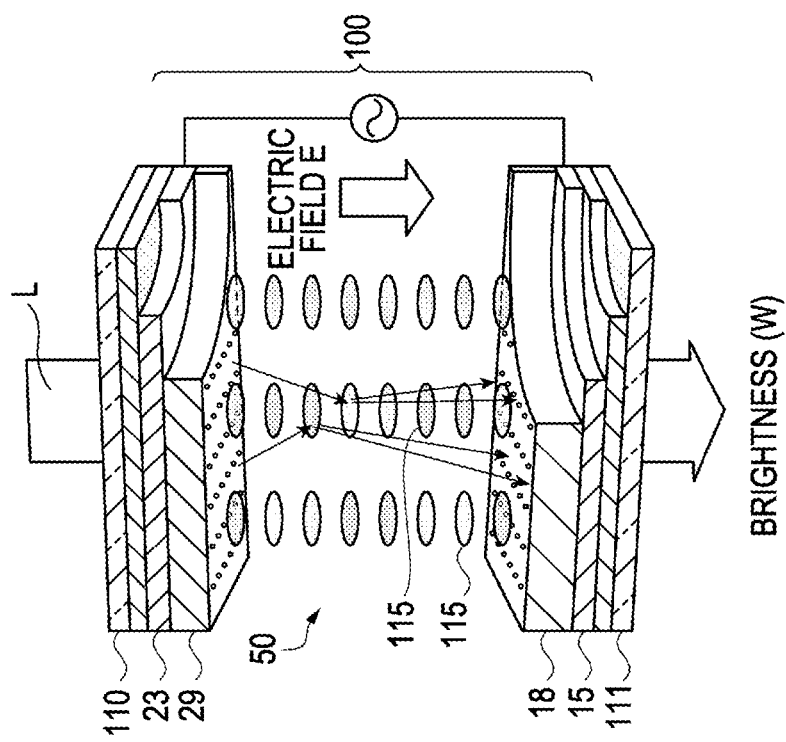
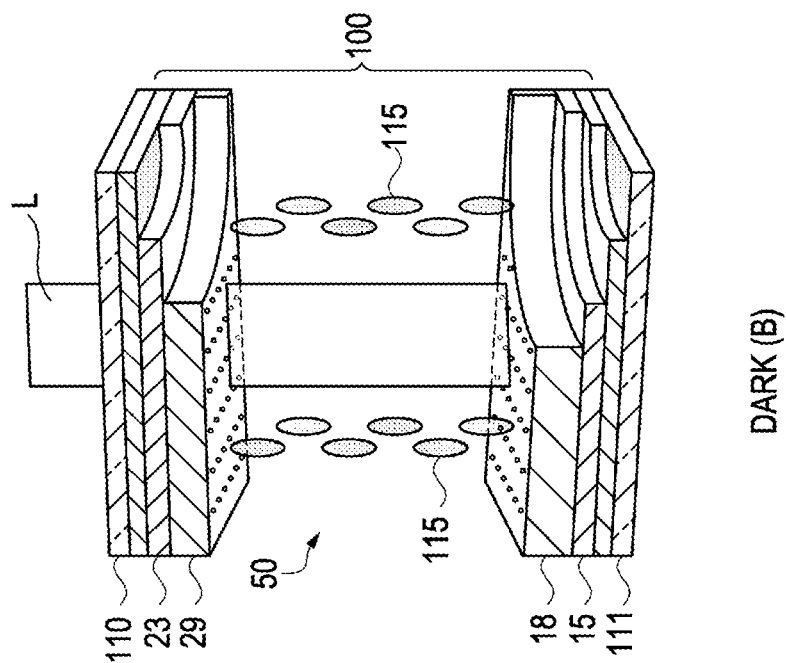

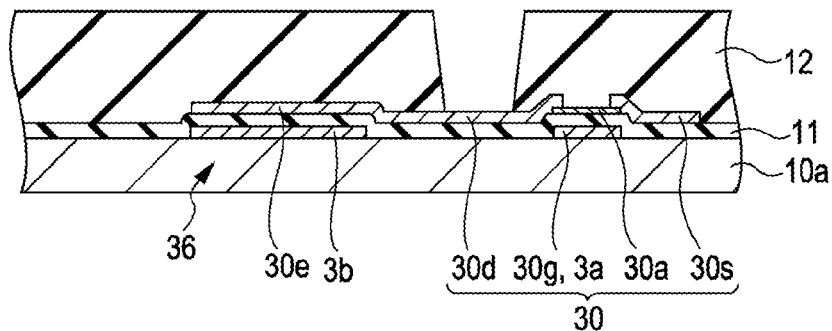
FIG. 8A
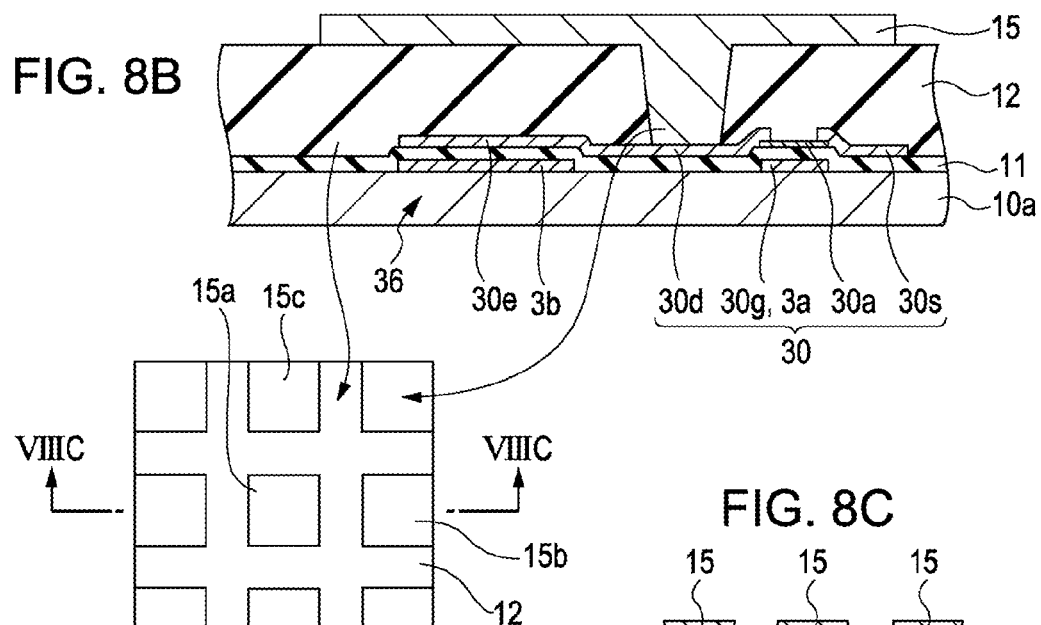
FIG. 8B
FIG. 8C
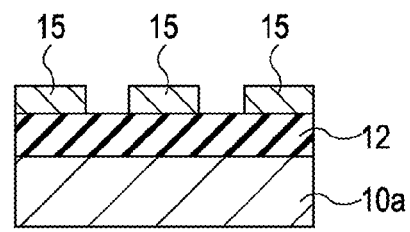
FIG. 8D
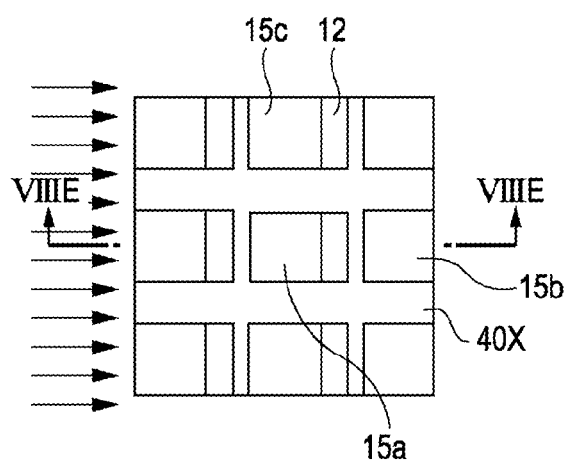
FIG. 8E
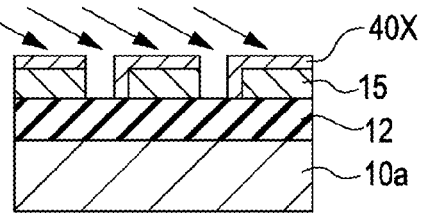

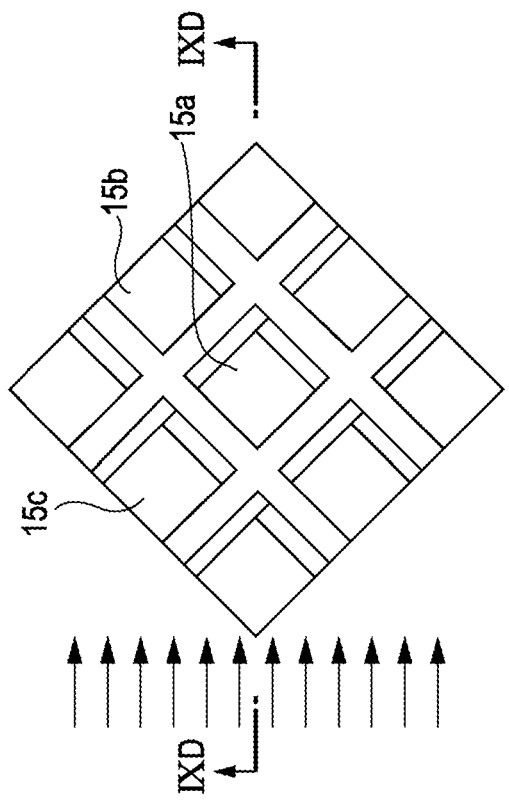
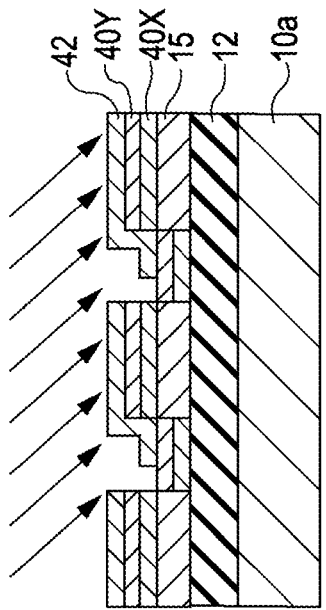
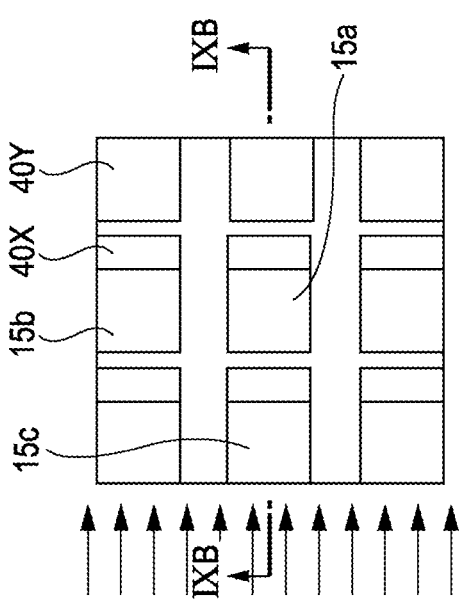
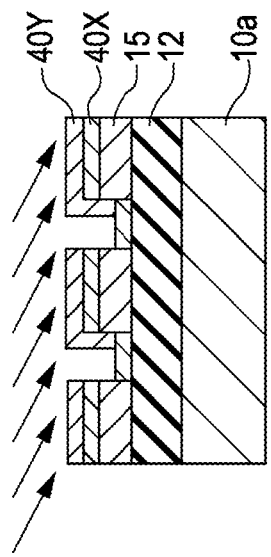

LIQUID CRYSTAL DISPLAY DEVICE, METHOD OF MANUFACTURING THE LIQUID CRYSTAL DISPLAY DEVICE AND ELECTRONIC APPARATUS

BACKGROUND

1. Technical Field

The present invention relates to a liquid crystal display device, a method of manufacturing the liquid crystal display device, and an electronic apparatus.

2. Related Art

In a liquid crystal display device such as a liquid crystal panel, an inorganic alignment film using an oblique physical vapor deposition has been developed as an alignment film for regulating alignment of the liquid crystal molecules. In particular, a liquid crystal display device having normally black properties in a vertical alignment (VA) mode is promising due to having a high contrast ratio. For example, a liquid crystal layer including liquid crystal molecules with negative dielectric anisotropy is used in the liquid crystal display device in the VA mode.

The liquid crystal layer is interposed between a first substrate having a pixel electrode disposed in a matrix form and a second substrate having a counter electrode. The pixel electrode and the counter electrode include an alignment film in which liquid crystal molecules are aligned in the normal direction of the substrate, respectively. In addition, hereinafter, the normal direction will be described as referring to the vertical direction.

When using the oblique physical vapor deposition for forming of the alignment film, if there is a step (convex portion) in the first substrate, an area in which the alignment film is not formed may occur in shadowed location. Thus, it is known that the oblique vapor deposition is performed from two directions as described in JP-A-2010-26274, the oblique vapor deposition is also performed in the shadowed area to suppress display unevenness and the like.

In addition, a panel body on which the liquid crystal layer is interposed between the first substrate and the second substrate is interposed between a pair of polarizing plates disposed in a Crossed Nichol. Absorption axes of two polarizing plates are disposed such that the liquid crystal molecules are arranged tilted in a direction of 45 degrees with respect to the first substrate when being viewed from the top.

If the pixel electrode and the counter electrode have the same potential (there is no vertical electric field), a black display is performed. If voltage is applied between the pixel electrode and the counter electrode (there is a vertical electric field), a white display is performed. A display of intermediate gradation may change the alignment direction of the liquid crystal molecules by adjusting the corresponding potential difference.

If a voltage is applied to the adjacent pixel electrodes to perform the black display and the white display, an electric field is generated in a gap between the pixel electrodes performing the black display and the white display, and the electric field (lateral electric field) intersects with (perpendicular of) the longitudinal direction of the corresponding gap when being viewed from the top. Since the lateral electric field is generated in a direction substantially parallel to the absorption axis which of polarizing palates, a black area will occur in a pixel electrode originally provided with a white display. In addition, since the corresponding black area generates a black area of stripe shape in the white display part as well as between the pixel electrodes, the brightness of the white display is reduced, and the contrast is lower. Therefore, there is a problem that the quality of display is deteriorated. In JP-A-2009-168924, a method of alleviating the lateral electric field by forming an absence part of a common electrode in the counter electrode (common electrode) has been explained. In addition, hiding this area using a black matrix is also known.

However, JP-A-2010-26274 is not described how to solve the problem that arises regarding the lateral electric field. In addition, JP-A-2009-168924 is described that the lateral field is alleviated by forming an absence part of a common electrode. However, it is necessary to form a second substrate including a pattern having the absence part of the common electrode, and there is a problem in that further manufacturing processes are required. In addition, when using the technique described in JP-A-2009-168924, aligning a position of the second substrate including a pattern having the absence part of the common electrode and a position of a first substrate including the pixel electrode is required. However, if the first and second substrates become large, it is difficult to align the positions of the first and second substrates. Therefore, there is a problem in that it is difficult to accommodate larger substrates. In addition, when using the black matrix, there is a problem that the opening rate itself is decreased.

SUMMARY

An advantage of some aspects of the invention can be realized as the following aspects or applications.

Application 1

A liquid crystal display device includes a substrate and a liquid crystal layer having negative dielectric anisotropy, the substrate including: a first pixel electrode; a second pixel electrode adjacent to the first pixel electrode in a first direction; a third pixel electrode adjacent to the first pixel electrode in a second direction intersecting the first direction; a first alignment film provided in a first gap between the first pixel electrode and the second pixel electrode to align the liquid crystal molecules in the liquid crystal layer along the second direction; a second alignment film provided in a second gap between the first pixel electrode and the third pixel electrode to align the liquid crystal molecules in the liquid crystal layer along the first direction; and a third alignment film provided in the first gap and the second gap while covering the pixel electrodes to align the liquid crystal molecules along a normal of the substrate, wherein the first gap includes a portion in which the first alignment film is in contact with the liquid crystal and a portion in which the third alignment film is in contact with the liquid crystal, and the second gap includes a portion in which the second alignment film is in contact with the liquid crystal and a portion in which the third alignment film is in contact with the liquid crystal.

According to Application 1, there is provided with a first alignment film in which the liquid crystal molecules are aligned (horizontal alignment) to a first gap between first and second pixel electrodes along a second direction which is the longitudinal direction of the gap, a second alignment film in which the liquid crystal molecules are aligned (horizontal alignment) to a second gap between first and third pixel electrodes along a first direction which is the longitudinal direction of the gap, and a third alignment film in which the liquid crystal molecules are aligned (vertical alignment) on the pixel electrode along the normal of the substrate.

Thus, by providing three alignment films which are the first alignment film, the second alignment film and the third alignment film, since the alignment films are densely provided between the first and second gaps when being viewed from the top, it is possible to eliminate an area on which a force which aligns the liquid crystal molecules is not applied.

If a potential difference between adjacent pixel electrodes is large (for example, if a pixel electrode becomes a power supply potential and adjacent pixel electrodes become ground potential), an electric field (lateral electric field) is generated in the direction intersecting with the longitudinal direction of the gap between the pixel electrodes. Since the first alignment film or the second alignment film, which horizontally aligns the liquid crystal molecules along the longitudinal direction of the gap, is provided, a disclination that the liquid crystal molecules are aligned by intersecting with the longitudinal direction due to the lateral electric field is suppressed. As a result, since a high contrast and sharp contours may be obtained, it is possible to provide a liquid crystal display device having a good quality. Herein, "upward" is defined as the direction from a first substrate toward the liquid crystal layer.

Application 2

The liquid crystal display device according to Application 1, wherein the first alignment film may be a first inorganic alignment film using an oblique physical vapor deposition method from the second direction, the second alignment film may be a second inorganic alignment film using an oblique physical vapor deposition method from the first direction, and the third alignment film may be a third inorganic alignment film using an oblique physical vapor deposition method from a direction intersecting the first direction and the second direction.

According to Application 2, a first inorganic alignment film and a second inorganic alignment film, which align the liquid crystal molecules along the longitudinal direction of the gap between adjacent pixel electrodes, may be disposed between the pixel electrodes, respectively. In addition, by using an oblique physical vapor deposition from a direction intersecting with a first direction and a second direction, the first inorganic alignment film (horizontal alignment film) or the second inorganic alignment film (horizontal alignment film) may be exposed between the pixel electrodes (shadow) through self-alignment. Therefore, it is possible to suppress the generation of disclination due to a horizontal electric field. Herein, the physical vapor deposition method may be exemplified by an electron beam deposition method, a resistance heating vapor deposition method, a sputtering method, an ion plating method or the like.

Application 3

The liquid crystal display device according to any one of Applications described above, the third alignment film may be disposed on the pixel electrode to cover the first alignment film and the second alignment film.

According to Application 3, on the pixel electrode, the second alignment film covers the first alignment film to vertically align the liquid crystal molecules along the normal of the substrate. In other words, on the pixel electrode, the liquid crystal molecules are vertically aligned along the normal of the substrate. Meanwhile, in at least some of areas between the pixel electrodes, the first alignment film is exposed to horizontally align liquid crystal molecules along the longitudinal direction of the gap. Therefore, the electric field between adjacent pixel electrodes (horizontal electric field) may reduce the occurrence of disclination which aligns the liquid crystal molecules to be intersected with the longitudinal direction of the gap.

Application 4

A method of manufacturing a liquid crystal display device including a substrate which is disposed with a first pixel electrode, a second pixel electrode adjacent to the first pixel electrode in a first direction, and a third pixel electrode adjacent to the first pixel electrode in a second direction intersecting the first direction, and a liquid crystal layer having negative dielectric anisotropy, including: forming a first alignment film provided in a first gap between the first pixel electrode and the second pixel electrode to align the liquid crystal molecules in the liquid crystal layer along the second direction; forming a second alignment film provided in a second gap between the first pixel electrode and the third pixel electrode to align the liquid crystal molecules in the liquid crystal layer along the first direction; and forming a third alignment film provided between the first gap and the second gap and on the pixel electrode to align the liquid crystal molecules along a normal of the substrate, wherein the first gap includes a portion in which the first alignment film is in contact with the liquid crystal and a portion in which the third alignment film is in contact with the liquid crystal, and the second gap includes a portion in which the second alignment film is in contact with the liquid crystal and a portion in which the third alignment film is in contact with the liquid crystal.

According to Application 4, the method of manufacturing a liquid crystal display device including: forming a first alignment film to align (horizontal alignment) the liquid crystal molecules between the first and second pixel electrodes along the second direction which is the longitudinal direction of the gap (process of forming a first alignment film); forming a second alignment film to align (horizontal alignment) the liquid crystal molecules between the first and third pixel electrodes along the first direction which is the longitudinal direction of the gap (a process of forming a second alignment film); and forming a third alignment film to align (vertical alignment) the liquid crystal molecules on the pixel electrodes along the normal of the substrate (a process of forming a third alignment film).

By providing the processes of forming the first alignment film, the second alignment film and the third alignment film, since the alignment films are densely provided between the first and second gaps when being viewed from the top, it is possible to eliminate an area to which a force which aligns the liquid crystal molecules is not applied.

If a potential difference between adjacent pixel electrodes is large (for example, if a pixel electrode becomes a power supply potential and adjacent pixel electrodes become ground potential), an electric field (lateral electric field) which aligns the liquid crystal molecules in the direction to be intersected with the longitudinal direction of the gap is generated.

Using the processes of forming the first alignment film and the second alignment film to horizontally align the liquid crystal molecules along the longitudinal direction of the gap, it is possible to suppress the occurrence of disclination which aligns the liquid crystal molecules to be intersected with the longitudinal direction of the gap by the lateral electric field.

Application 5

The method according to Application 5, wherein the first alignment film may be formed using an oblique physical vapor deposition method from the second direction, the second alignment film may be formed using an oblique physical vapor deposition method from the first direction, and the third alignment film may be formed using an oblique physical vapor deposition method from a direction intersecting the first direction and the second direction.

According to Application 5, the first alignment film and the second alignment film, which horizontally align liquid crystal molecules along the longitudinal direction of the gap between two adjacent pixel electrodes, may be disposed, respectively. The first alignment film is formed between the pixel electrodes by an oblique physical vapor deposition method from the second direction. The second alignment film is formed between the pixel electrodes by an oblique physical vapor deposition method from the first direction. In addition, in the oblique physical vapor deposition method from the first direction, the pixel electrode functions as a self-alignment mask, such that a part of the pixel electrode to be shadowed along the second direction maintains a condition where the alignment film to be aligned along the second direction is exposed, even after performing the oblique physical vapor deposition method from the first direction.

In addition, since the second alignment film to vertically align the liquid crystal molecules along the normal of the substrate is formed by using the oblique physical vapor deposition method from a direction intersecting with the first direction and the second direction. In a condition where the first alignment film is exposed to a space between the pixel electrodes (shadow) which is a first gap, and the second alignment film is exposed to a space between the pixel electrodes (shadow) which is a second gap, the third alignment film may be formed on the first gap, the second gap and the pixel electrode.

Application 6

An electronic apparatus includes any one of the liquid crystal display devices described above.

According to Application 6, since the electronic apparatus may include the liquid crystal display device capable of reproducing sharp contours, electronic apparatus having a superior image quality may be provided.

Application 7

An electronic apparatus includes the liquid crystal display device formed using the method of manufacturing the liquid crystal display device described above.

According to Application 7, since the electronic apparatus may include the liquid crystal display device formed using the manufacturing method of the liquid crystal display device to obtain the liquid crystal display device in which light leakage is suppressed between the pixel electrodes, the electronic apparatus capable of reproducing the sharp contours may be provided.

BRIEF DESCRIPTION OF THE DRAWINGS

The invention will be described with reference to the accompanying drawings, wherein like numbers reference like elements.

FIG. 5A is a perspective view illustrating the alignment of the liquid crystal molecules if an electric field is not applied, and FIG. 5B is a perspective view illustrating the alignment of the liquid crystal molecules if an electric field is applied.

FIGS. 8A to 8E are cross-sectional views and plan view illustrating processes for manufacturing a liquid crystal display device.

FIGS. 9A to 9D are cross-sectional views and plan view illustrating processes for manufacturing a liquid crystal display device.

DESCRIPTION OF EXEMPLARY EMBODIMENTS

Hereinafter, embodiments embodying the present invention will be described based on drawings.

Liquid Crystal Display Device Configuration

In a configuration of a liquid crystal display device according to the embodiment, an active matrix type liquid crystal display device having a thin film transistor (TFT) as a switching element of a pixel will be described with reference to FIGS. 1A to 3B.

Figure 1A:
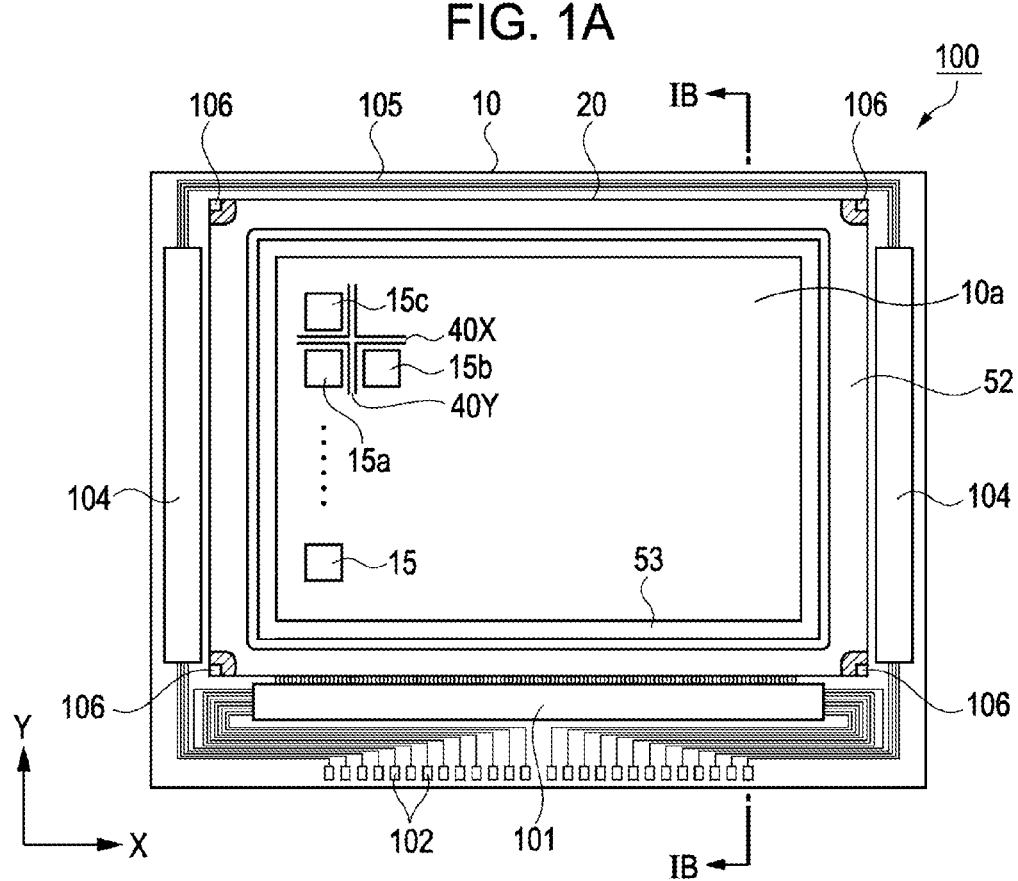
FIG. 1A is a plan view illustrating a liquid crystal display device.
Figure 1B:
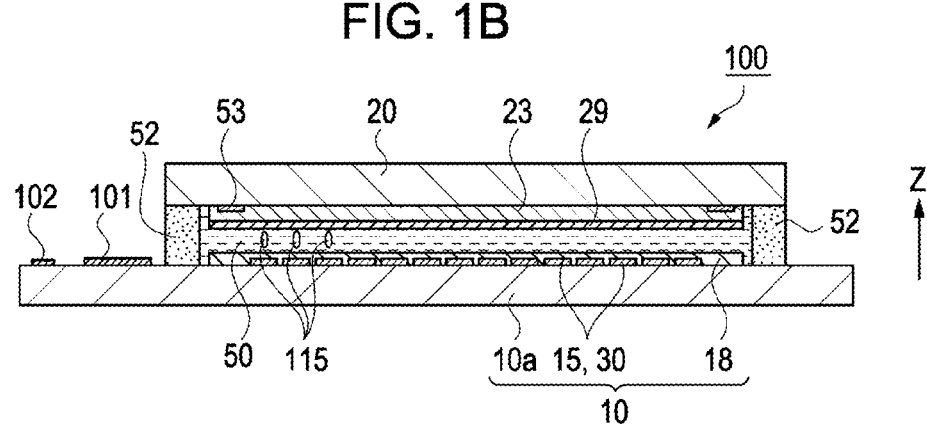
FIG. 1B is a cross-sectional view illustrating the liquid crystal display device taken along a line IB-IB illustrated in FIG. 1A.
Figure 2:
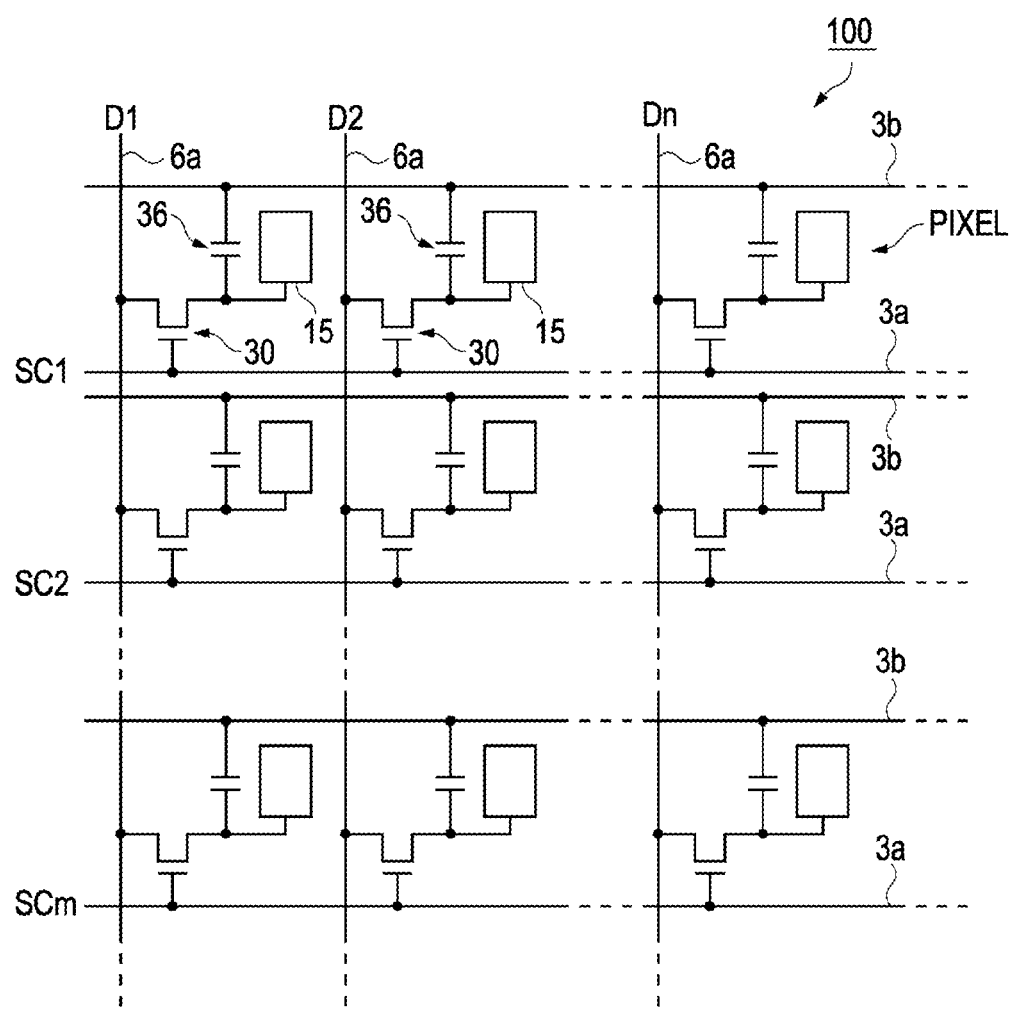
FIG. 2 is an equivalent circuit diagram illustrating an electrical configuration of the liquid crystal display device.
Figure 3A:
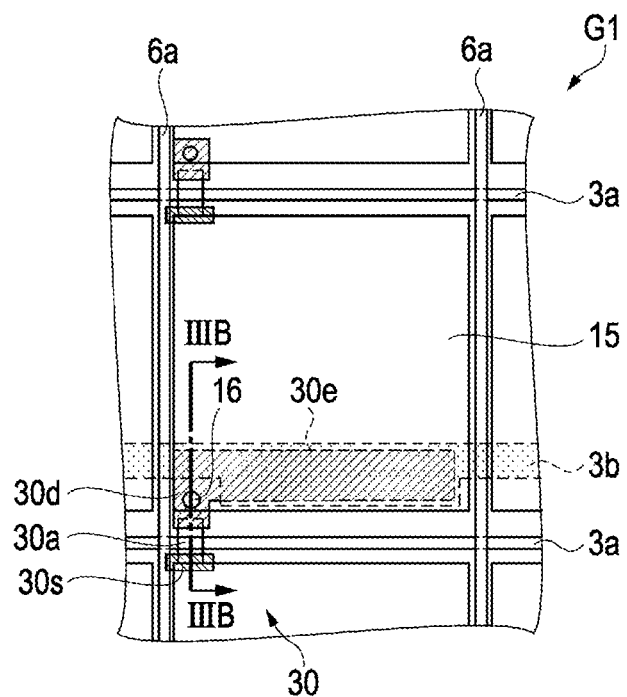
FIG. 3A is a plan view illustrating an electrical configuration of pixels.
Figure 3B:
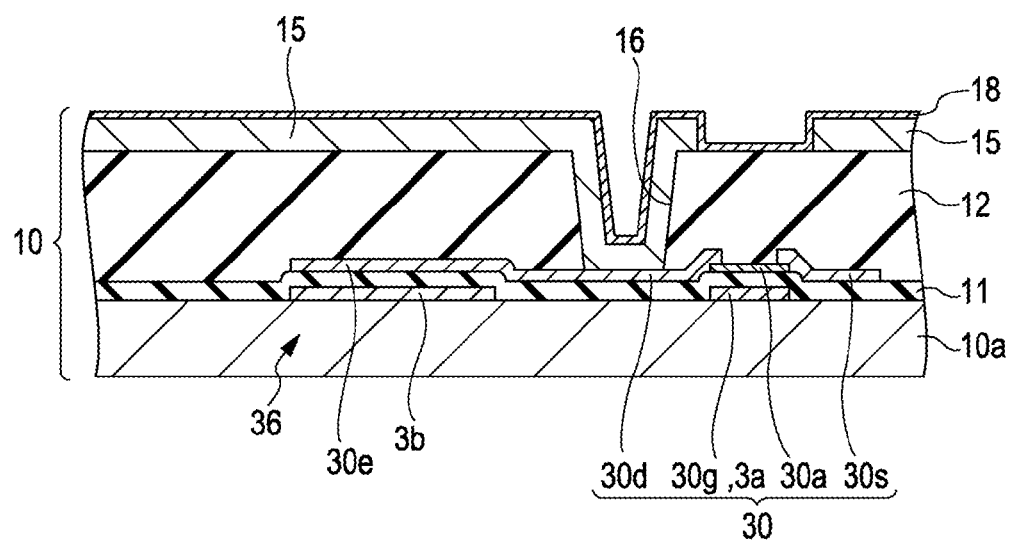
FIG. 3B is a cross-sectional view taken along a line IIIB-IIIB illustrated FIG. 3A.

FIGS. 1A and 1B are schematic diagrams illustrating a configuration of a liquid crystal display device. FIG. 1A is a plan view, and FIG. 1B is a cross-sectional view taken along a line IB-IB illustrated in FIG. 1A. FIG. 2 is an equivalent circuit diagram illustrating an electrical configuration of the liquid crystal display device. FIG. 3A is a plan view illustrating an electrical configuration of pixels, and FIG. 3B is a cross-sectional view taken along a line IIIB-IIIB illustrated in FIG. 3A.

As illustrated in FIGS. 1A and 1B, a liquid crystal display device 100 includes an element substrate 10, a counter substrate 20, and a liquid crystal layer 50 interposed between the element substrate 10 and the counter substrate 20, as substrates. Herein, an "up" (z direction) is defined as the direction from the element substrate 10 toward the liquid crystal layer 50.

In addition, the X direction as a first direction is defined as the direction from a pixel electrode 15a, as a first pixel electrode, toward a pixel electrode 15b, as a second pixel electrode, and the Y direction as the second direction is defined as the direction from the pixel electrode 15a toward a pixel electrode 15c, as a third electrode.

As first alignment film extending in the X direction, a first direction alignment film 40X is formed in the longitudinal direction of a gap, a first gap between the pixel electrode 15a and the pixel electrode 15c to horizontally align liquid crystal molecules 115.

As first alignment film extending in the Y direction, a second direction alignment film 40Y is formed in the longitudinal direction of a gap, a second gap between the pixel electrode 15a and the pixel electrode 15b to horizontally align liquid crystal molecules 115.

A detailed explanation of the first direction alignment film 40X and the second direction alignment film 40Y will be described later. In addition, the reference signs of pixel electrodes 15a, 15b and 15c are provided for convenience to indicate the relationship of relative positions of the pixel electrodes 15, and, except for the relationship of relative positions of the pixel electrodes 15, the pixel electrodes 15 are equivalent.

The element substrate 10 is slightly larger than the counter substrate 20, and the two substrates are connected to each other by a sealing material 52. In addition, the gap is filled with liquid crystals including liquid crystal molecules 115 having negative dielectric anisotropy to configure the liquid crystal layer 50.

As illustrated in FIG. 1A, the element substrate 10 is provided with a data driving circuit 101 along one side thereof. In addition, the element substrate 10 is disposed with a plurality of terminals 102 electrically connected thereto. Two sides which intersecting (orthogonal) with the one side of the element substrate 10 are provided with a scanning line driving circuit 104. In addition, when being viewed from the top, a side parallel to the one side which interposes a counter substrate 20 is provided with a plurality of wirings 105 connecting the two scanning line driving circuits 104.

The inside of the seal material 52 disposed in a frame shape is provided with a parting portion 53 in the same frame shape. The parting portion 53 is used with a metal material or resin material having a light blocking effect.

As illustrated in FIG. 1B, a surface of the liquid crystal layer 50 side of the element substrate 10 is provided with a TFT 30 as the pixel electrode 15 and the switching element, which are provided for each pixel, signal wirings, and the alignment film 18 covering the TFT 30 and the signal wirings.

A surface of the liquid crystal layer 50 side of the counter substrate 20 is provided with a parting portion 53, a common electrode 23, which is provided to cover the parting portion 53, and an alignment film 29 which is provided to cover the common electrode 23.

The alignment film 18 is an inorganic alignment film which will be described below. In addition, the alignment film 29 for example, a vertical alignment film aligned in anti-parallel with an alignment film 18 (vertical alignment film 42 described below) on the pixel electrode 15, is formed by depositing silicon dioxide ($SiO_2$) by an oblique physical vapor deposition method so as to have an oblique inclination of about 45 to 65 degrees relative to the normal of the counter substrate 20. Further, the alignment film 18 will be described in detail later. The alignment film 18 may be a combination of several types of alignment film, for example.

The common electrode 23 provided on the counter substrate 20 is electrically connected to the wiring on the element substrate 10 side by an upper and lower conductive section 106 provided at each corner of the counter substrate 20 as illustrated in FIG. 1A.

FIG. 2 is an equivalent circuit diagram illustrating an electrical configuration of a liquid crystal display device. As illustrated in FIG. 2, the liquid crystal display device 100 has a plurality of scanning lines 3a and a plurality of data lines 6a, which are signal lines insulated from and perpendicular to each other. In addition, there are a capacitance lines 3b disposed so as to be parallel to the scanning lines 3a at regular intervals.

An area partitioned into a grid by the scanning lines 3a, the data lines 6a and the capacitance line 3b is provided with the pixel electrode 15, the TFT 30 as a switching element to control switching, and a holding capacitor 36. A pixel is configured by those components. That is, the pixels are arranged in a matrix form.

The scanning line 3a is electrically connected to the gate of the TFT 30, and the data line 6a is electrically connected to the source of the TFT 30. The pixel electrode 15 is electrically connected to the drain of the TFT 30.

The data line 6a is connected to the data line driving circuit 101 (see FIGS. 1A and 1B) and supplies image signals D1 to Dn supplied from the data line driving circuit 101 to the pixel. The scanning line 3a is connected to a scanning line driving circuit 104 (see FIG. 1A) and supplies scanning signals SC1 to SCm supplied from the scanning line driving circuit 104 to each pixels. The image signals D1 to Dn supplied from the data line driving circuit 101 to the data line 6a may be sequentially supplied in order of line, or may be supplied for each group together for a plurality of data lines 6a adjacent to each other. The scanning line driving circuit 104 sequentially supplies the scanning signals SC1 to SCm to scanning lines 3a in order of line in pulse form at a predetermined timing.

The liquid crystal display device 100 has a configuration in which TFT 30, switching element, is turned on by input of the scanning signals SC1 to SCm during a predetermined period, so that the image signals D1 to Dn supplied from the data lines 6a may be written to the pixel electrode 15 at a predetermined timing. In addition, the image signals D1 to Dn, written to the liquid crystal layer 50 through the pixel electrode 15, having a predetermined level, are retained between the pixel electrode 15 and the common electrode 23 oppositely disposed through the liquid crystal layer 50 for a constant period.

In order to suppress the retained image signals D1 to Dn from changing due to a leakage, the holding capacitor 36 is connected in parallel with the liquid crystal capacitor between the pixel electrode 15 and common electrode 23. The holding capacitor 36 is provided between the drain of the TFT 30 and the capacitance line 3b.

FIG. 3A is a plan view illustrating a configuration of a pixel, and FIG. 3B is a cross-sectional view taken along a line IIIB-IIIB illustrated FIG. 3A.

As illustrated in FIG. 3A, the pixel G1 includes a rectangular pixel electrode 15 disposed in a partitioned area by the scanning lines 3a and the data lines 6a while being insulated from each other and intersecting with each other, and TFT 30 which controls the switching of the potential of the pixel electrode 15.

The TFT 30 is provided on the scanning line 3a in the vicinity of the intersection of the scanning line 3a and the data line 6a. The TFT 30 includes a semiconductor layer 30a having a source disposed by interposing a gate, a drain, and three channel regions interposed in the source and the drain, and the source is formed with a source electrode 30s extended from the data line 6a. In addition, the drain is formed with a drain electrode 30d which is substantially rectangular when being viewed from the top. The drain electrode 30d has an extension portion 30e expanded to the side of the pixel electrode 15. The pixel electrode 15 are provided with a contact hole 16 which is substantially circular when being viewed from the top at a position overlapped with the drain electrode 30d so as to electrically connect with the drain electrode 30d.

The capacitance line 3b is provided so as to be parallel to the scanning lines 3a in the vicinity of the drain side of semiconductor layer 30a and has a widened portion overlapped with the extension portion 30e of the drain electrode 30d.

As illustrated in FIG. 3B, on the substrate body 10a, the scanning line 3a and the capacitance line 3b using metal wiring materials, such as aluminum, are provided, and a gate insulating film 11 using an insulator such as silicon oxide is provided so as to cover the scanning line 3a and the capacitance line 3b.

The semiconductor layer 30a is provided on gate insulating film 11 covering the scanning line 3a. The thickness of the semiconductor layer 30a is about 50 nm. The portion covering the scanning line 3a is a gate, and a portion opposed to the scanning line 3a acts as a gate electrode 30g. That is, the TFT 30 has a bottom gate structure.

As described above, as the source electrode 30s is provided so as to be overlapped with the source of the semiconductor 30a, the drain electrode 30d is provided so as to be overlapped with the drain of the semiconductor 30a. The source electrode 30s and the drain electrode 30d using metal wiring materials such as aluminum are provided. The thicknesses of the scanning line 3a, the capacitance line 3b, the source electrode 30s (data line 6a) and the drain electrode 30d, using the metal wiring materials are about 500 to 600 nm.

The interlayer insulating film 12 is provided so as to cover the semiconductor layer 30a, the source electrode 30s, and the drain electrode 30d. The interlayer insulating film 12 is formed so as to mitigate the step difference of the surface capable of forming the semiconductor layer 30a, the source electrode 30s, and the drain electrode 30d in thickness of about 1 to 2 µm.

The interlayer insulating film 12 covering the drain electrode 30d includes a contact hole 16 to conduct the pixel electrode 15 and the drain electrode 30d. The pixel electrode 15 is composed of a transparent conductive film such as ITO (Indium Tin Oxide).

In the above example, although the liquid crystal display device 100 illustrated in FIGS. 1A and 1B has been described in using a transparent liquid crystal display device, a reflective liquid crystal device provided with a reflective layer may be used as the liquid crystal display device 100. When using the transparent liquid crystal display device, since it is possible to control light of a region covering TFT 30, for example, it is possible to improve the aperture ratio. In addition, although the TFT 30 as illustrated in FIG. 3B has been described in a bottom gate type TFT, a top gate type TFT may be used as the TFT 30. When using the top gate type TFT, the semiconductor layer used in the TFT 30 may be subjected to a heat treatment, ahead of the other components. That is, since a polysilicon is formed without exposing other components at high temperature, it is possible to use the polysilicon with excellent mobility in the semiconductor layer.

In addition, a color display may be realized by adding a color filter. Specifically, the color display may be realized by making the sub-pixel into a rectangular shape and treating a sub-pixel of RGB three colors as one pixel.

Configuration of Alignment film

Figure 4C:
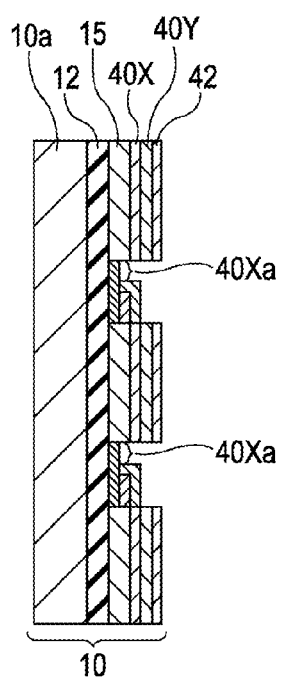
FIG. 4C is a cross-sectional view taken along a line IVC-IVC perpendicular to the line IVB-IVB.
Figure 4A:
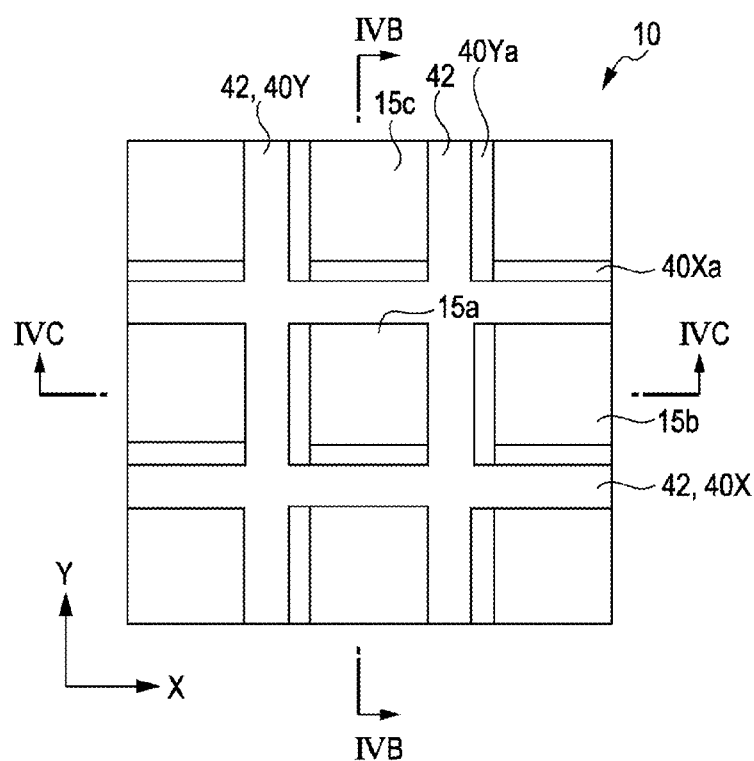
FIG. 4A is a plan view illustrating the corresponding relationship between a pixel electrode and an alignment film.
Figure 4B:
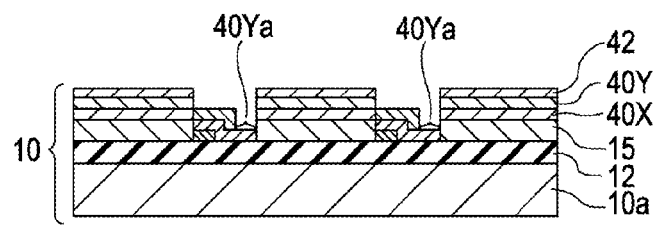
FIG. 4B is a cross-sectional view taken along a line IVB-IVB.

Hereafter, the configuration of alignment film will be described. Herein, since a description of the TFT 30 or the like has already been made above, a detailed description is omitted, and the corresponding relationship between the pixel electrode and the alignment film will be mainly described. FIG. 4A is a plan view illustrating the corresponding relationship between the pixel electrode and the alignment film according to this embodiment, FIG. 4B is a cross-sectional view taken along line IVB-IVB of FIG. 4A, and FIG. 4C is a cross-sectional view, taken along line IVC-IVC perpendicular to the line IVB-IVB. Herein, the TFT 30 formed on the substrate body 10a, and the like, is omitted (see FIG. 3B). The alignment film 18 includes a first direction alignment film 40X formed along the longitudinal direction (X direction) of a gap between two adjacent pixel electrodes 15a and 15c. The first direction alignment film 40X has the property which horizontally aligns the liquid crystal molecules 115 in the X direction. In addition, a portion of the first direction alignment film 40X, which is an exposure area 40Xa, is directly in contact with the liquid crystal layer 50 (see FIGS. 1A and 1B).

In addition, a second direction alignment film 40Y formed in a gap between the two adjacent pixel electrodes 15a and pixel electrode 15b is provided on the element substrate 10. The second direction alignment film 40Y has a property of horizontally aligning the liquid crystal molecules 115 in Y direction. Further, a portion of the second direction alignment film 40Y, which is an exposure region 40Ya, is in contact with the liquid crystal layer 50 (see FIGS. 1A and 1B).

That is, the pixel electrode 15 includes the first direction alignment film 40X along one side thereof and the second direction alignment film 40Y along other directional side (orthogonal in this case) other than the side.

A vertical alignment film 42 which is a third alignment film is provided on the pixel electrode 15a. The vertical alignment film 42 has a property in which the first direction alignment film 40X and the second direction alignment film 40Y intersect each other (in the embodiment, 45 degrees bisecting an angle between the first direction alignment film 40X and the second direction alignment film 40Y) to horizontally align the liquid crystal molecules 115 along the element substrate 10, if a voltage between the common electrode 23 is provided on the counter substrate 20. In addition, when the electric field is not applied, the vertical alignment film 42 has a property to align the liquid crystal molecules 115 approximately vertically (deviation of pre-tilt) along a normal of the substrate body 10a.

In the first direction alignment film 40X, the second direction alignment film 40Y, and the vertical alignment film 42, having the property described above, the first direction alignment film 40X which is an inorganic alignment layer is formed by making the inorganic material come flying using the oblique physical vapor deposition method from a direction considering the longitudinal direction of a gap between two adjacent pixel electrodes 15a and 15c, for example.

In addition, by making the inorganic material come flying, which is the alignment film material, using the oblique physical vapor deposition method from a direction considering a longitudinal direction of a gap between two adjacent pixel electrodes 15a and 15b, the second direction alignment film 40Y is formed as the first inorganic alignment film aligned in a direction different from the gap between the pixel electrodes 15a and 15b.

In addition, there is a method wherein the vertical alignment film 42 is formed as the second inorganic alignment film by make the inorganic material come flying using the oblique physical vapor deposition method from a direction to hide the first direction alignment film 40X and the second direction alignment film 40Y by the pixel electrode 15 (For example, bisector direction of an angle between the first direction alignment film 40X and the second direction alignment film 40Y). The detailed description will be described later.

The alignment film 18 is configured by three layers of the first direction alignment film 40X, the second direction alignment film 40Y and the vertical alignment film 42. In addition, the gap between the pixel electrodes 15 is expanded and illustrated for convenience. Further, the pixel electrodes 15 are covered by the first direction alignment film 40X, the second direction alignment film 40Y and the vertical alignment film 42.

As mentioned above, the element substrate 10 is formed with an exposure area 40Xa in which the first direction alignment film 40X is exposed to a shadow area of the pixel electrode 15 using the oblique physical vapor deposition. Similarly, the element substrate 10 is formed with an exposure area 40Ya to which the second direction alignment film 40Y is exposed. In addition, a vertical alignment film 42 as described above is formed on the pixel electrode 15.

Light Control

Hereinafter, a mechanism to control the brightness of transmittance light will be described using the above-mentioned liquid crystal display device 100 (see FIGS. 1A and 1B). FIG. 5A is a perspective view illustrating the alignment of the liquid crystal molecules if an electric field is not applied. FIG. 5B is a perspective view illustrating an alignment of the liquid crystal molecules if an electric field is applied. As illustrated in FIGS. 5A and 5B, the liquid crystal display device 100 is interposed by polarizing plates 110 and 111 disposed in the Crossed Nichol.

The absorption axis of a polarizing plate 100 is disposed along the longitudinal direction (Y direction) of a gap between the pixel electrode 15a and the pixel electrode 15b in FIG. 4A. In addition, the absorption axis of a polarizing plate 111 is disposed along the longitudinal direction (X direction) of a gap between the pixel electrodes 15a and 15c in FIG. 4A.

The vertical alignment film 42 is formed on the pixel electrode 15 so as to align the liquid crystal molecules 115 by the vertical electric field along a plane having 45 degrees with respect to the absorption axis of the polarizing plates 110 and 111 when being viewed from the top of the pixel electrode 10 if a voltage is applied between the pixel electrode 15 and the common electrode 23 (if a vertical electric field is applied).

In a state in which a voltage is not applied between the pixel electrode 15 and the common electrode 23 (vertical electric field is not applied), the liquid crystal molecules 115 illustrated in FIG. 5A are approximately vertically (deviation of pre-tilt) aligned along a normal of the substrate body 10a within the liquid crystal layer 50.

Therefore, since light L incident on the polarizing plate 110 reaches polarizing plate 111 of output side causing almost no retardation by the liquid crystal layer 50, and is absorbed into polarizing plate 111, a black display is made.

In a state in which if a voltage is applied between the pixel electrode 15 and the common electrode 23 (vertical electric field is applied), the liquid crystal molecules 115 illustrated in FIG. 5B are at 45 degrees with respect to the absorption axis of the polarizing plates 110 and 111 and are aligned to follow the element substrate 10 within the liquid crystal layer 50.

That is, if the vertical electric field which is sufficiently strong, in other words, a voltage having a range capable of aligning the liquid crystal molecules 115 in approximately parallel to the element substrate 10, is applied between the pixel electrode 15 and the common electrode 23, the liquid crystal layer 50 performs the same operation as that of the ½ wavelength plate, light L reaches the polarizing plate 111 in state where the polarizing direction is rotated at angle of 90 degrees. Therefore, the light L is transmitted through the polarizing plate 111, the white display (W) is made. The display of intermediate gradation changes the alignment direction of the liquid crystal molecules by moderating the relevant electric field.

Suppression of Disclination

Figure 6A:
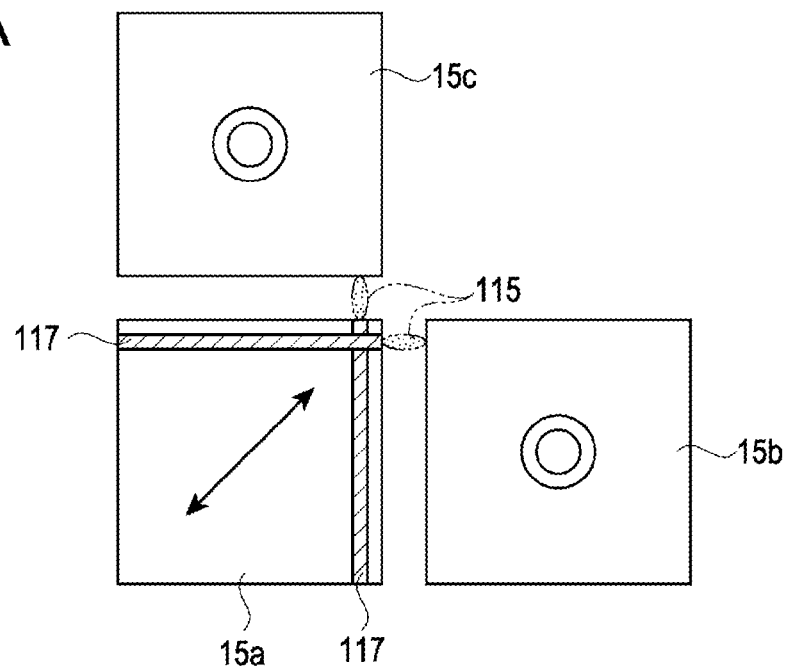
FIG. 6A is a plan view illustrating a condition in which a disclination occurs.
Figure 6B:
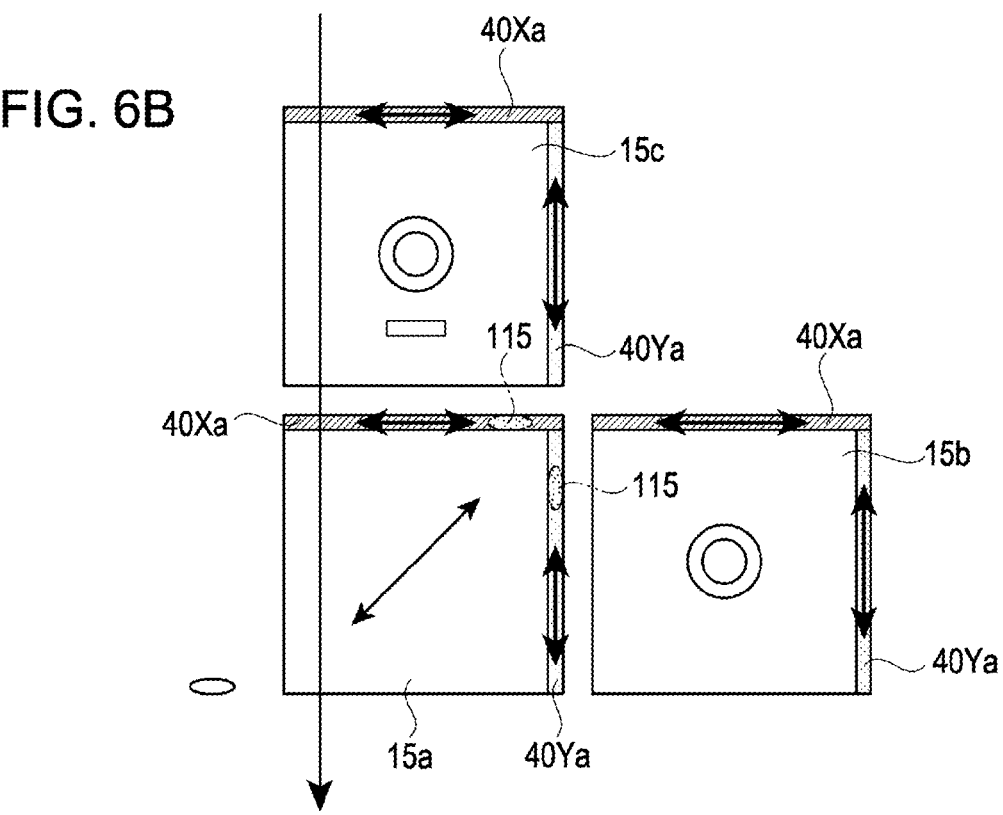
FIG. 6B is a plan view illustrating a condition in which the disclination is suppressed.

Next, a structure that allows the suppression of disclination will be described with reference to FIGS. 6A and 6B. FIG. 6A is a plan view for showing a state in which a disclination occurs by a lateral directional electric field between the pixel electrodes. FIG. 6B is a plan view showing a state in which the disclination may be suppressed in accordance to the present embodiment. Since the details of the structure for the control of light are described above, the following is described using a simplified drawing.

If voltage for the white is applied between the pixel electrode 15a and the common electrode 23 (for example, maximum voltage) and the pixel electrode 15b and the pixel electrode 15c are the same potential as the common electrode 23 (voltage is not applied, ground potential, for example), a square pixel electrode 15a horizontally aligns the liquid crystal molecules 115 in the diagonal direction (45°). In this case, the pixel electrode 15b and the pixel electrode 15c vertically align the liquid crystal molecules 115 (indicated by ⊙). In this case, a lateral electric field is generated between the pixel electrodes 15a and the pixel electrode 15b or the pixel electrode 15c.

In the case of generating the lateral electric field, the liquid crystal molecules 115 are aligned in a direction different from the original alignment direction by the lateral electric field (disclination). In addition, in this case, on the pixel electrode 15a to be originally displayed white, the low brightness region 117 having the lower brightness is generated in the direction according to the pixel electrodes 15a and 15b and in the direction according to the pixel electrodes 15a and 15c and the contrast is reduced, and the expression of the contour is smoothed.

On the other hand, in the structure shown in FIG. 6B, as shown in FIGS. 1A and 1B, an exposure area 40Xa which horizontally aligns the liquid crystal molecules 115 in the X direction (see FIG. 1A) is exposed in the gap between the pixel electrode 15a and the pixel electrode 15c. In addition, an exposure area 40Ya which horizontally aligns the liquid crystal molecules 115 in the Y direction is exposed in the gap between the pixel electrode 15a and the pixel electrode 15c. Therefore, the liquid crystal molecules 115 positioned in the gap between the pixel electrodes 15a and 15b are horizontally aligned along the longitudinal direction of the corresponding gap. Similarly, the liquid crystal molecules 115 positioned in the gap between the pixel electrode 15a and 15c are horizontally aligned along the longitudinal direction of the corresponding gap. In other words, it is possible to prevent the degradation of contrast due to the disclination and represent in sharp outline by providing the exposure area 40Xa and the exposure area 40Ya.

Figure 7:
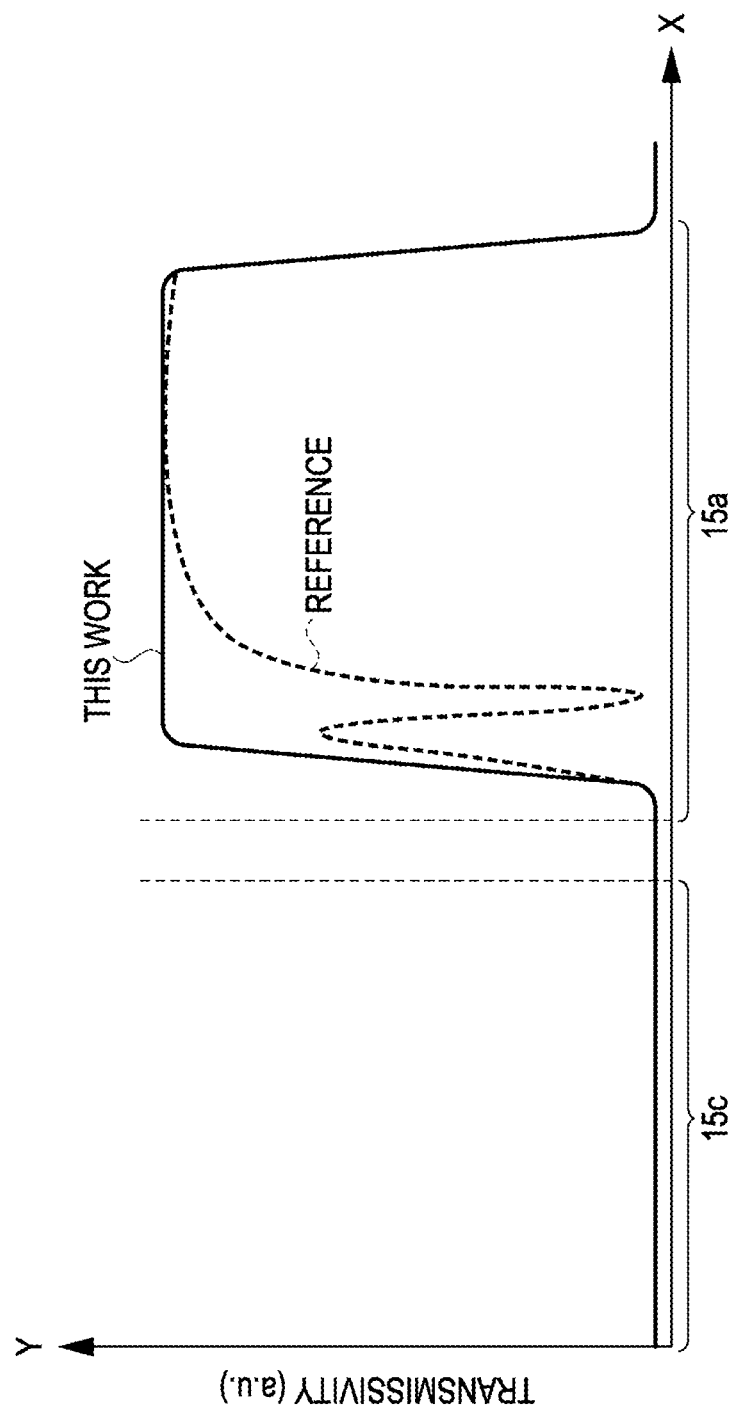
FIG. 7 is a graph illustrating a relationship between light transmittance and a coordinate if the pixel electrodes having a structure illustrated in FIG. 6A are adjacent to each other and the white display and the black display are performed, and a relationship between light transmittance and a coordinate if the pixel electrodes having a structure illustrated in FIG. 6B are adjacent to each other and the white display and the black display are performed.

FIG. 7 is a graph showing the relationship between light transmissivity and the coordinate in a case where the adjacent pixel electrodes perform a black display and a white display in a structure of FIG. 6A, and the relationship between light transmissivity and the coordinate in a case where the adjacent pixel electrodes perform a black display and a white display in a structure of FIG. 6B. The graph is used for axis X as each coordinate and the X direction represents the direction of the arrow shown in FIG. 6B. For example, since the absolute value of the transmissivity changes by the thickness of the liquid crystal layer or the transmissivity of the polarizing plate, and the like, herein, using the relative transmissivity meeting the conditions, the light transmissivity is used as Y axis, and an arbitrary gradation (a.u.) is used as the unit of Y asis.

As shown in FIG. 7, when using the structure (Reference) of FIG. 6A, a disclination occurs in a area (white display area) of the pixel electrode 15a as shown by the dotted line, and in some of the white display area, a decrease (dotted line) in the transmissivity at a position close to pixel electrode 15c (black display area) occurs. In contrast, when using the structure (This work) of FIG. 6B, the liquid crystal molecules 115 are horizontally aligned along the longitudinal direction of the corresponding gap by force, due to the alignment property of the exposure area 40Xa. As a result, the generation of disclination occurring in the direction intersecting with the longitudinal direction of the corresponding gap is suppressed. Thus, as shown by the solid line, the generation of low brightness area 117 (see FIG. 6A) of the pixel electrode 15a region (white display area) is suppressed to improve the brightness of the pixel electrode 15a area.

Herein, the rate of improvement in brightness in the pixel electrode 15a area (the white display area) is compared with that of area of pixel electrode 15a area (the white display area), which is represented as the structure of FIG. 6A and the structure of FIG. 6B by using a graph of FIG. 7. In this case, if the maximum white brightness and the minimum black brightness are adjacent to each other, the transmissivity are improved by about 25%. Therefore, when compared to using the related art, it is possible to obtain high contrast and represent sharp contours.

Method of Manufacturing the Liquid Crystal Display Device

Next, the manufacturing method of the liquid crystal display device will be described with reference to the drawings. FIGS. 8A to 9D are a cross-sectional view and a plan view for explaining a manufacturing method of the liquid crystal display device described above.

First, a TFT 30, an interlayer insulating film 12, and a contact hole 16, and the like are formed on the substrate body 10a, using a typical manufacturing method. The processes described above use a CVD method or a photolithographic method. FIG. 8A shows a cross-sectional view of the process completed thus far. In addition, in a cross-sectional view and a plan view of the subsequent processes, since the TFT 30, the contact hole 16, or the like are already described above, explanation thereof is omitted. Further, since the structure of electric wiring has been described, an explanation thereof is omitted.

Next, the pixel electrode 15 is formed on substrate body. Since ITO (Indium Tin Oxide) has a high light transmissivity and a low electrical resistance in comparison with other transparent electrodes, ITO (Indium Tin Oxide) may used as a suitable material, for example, a tin oxide or a zinc oxide may be preferred material. In addition, a reactive magnetron sputtering method or vacuum deposition method may be exemplified as the film forming method of the pixel electrode 15. Further, a sol-gel method is being developed as the film forming method.

The pixel electrode 15, after forming the film in the manner described above, is formed on the interlayer insulating film 12 by dividing to prescribed patterns using photolithographic method, for example. FIG. 8B is a plan view showing the completed manufacturing processes thus far, and FIG. 8C is a cross sectional view taken along line VIIIC-VIIIC shown in FIG. 8B. FIG. 8B illustrates the corresponding relationship between FIG. 8A and drawings illustrated later. The pixel electrode 15 is formed on the interlayer insulating film 12. Further, the pixel electrode 15 corresponds to one of the pixel electrodes 15 shown the pixel electrodes 15 disposed in a nine item matrix.

In addition, as mentioned above, the description of the contact hole 16 and the like in FIG. 8C is omitted.

Next, a first direction alignment film 40X is formed on the pixel electrodes 15 (process of forming the first direction alignment film). The first direction alignment film 40X is formed with inorganic material such as an aluminum oxide ($Al_2O_3$), a titanium oxide ($TiO_2$), a silicon monoxide (SiO) and the like, by using an oblique physical vapor deposition. Since the two adjacent pixel electrodes 15a and 15c are in parallel with the X direction (see FIG. 1A), the first direction alignment film 40X is formed by including a columnar liquid crystal which is grown by make the inorganic material come flying in a predetermined angle (80 degrees to 85 degrees, for example) with respect to the normal of the element substrate 10. The oblique physical vapor deposition may be used with electron beam evaporation, resistance heat vapor deposition, sputtering, an ion plating method, and the like. The first direction alignment film 40X which has an alignment property along the X direction, according to the substrate body 10a, may be obtained by processing the material using the oblique physical vapor deposition described above in an exposed state.

FIG. 8D shows a plan view of the condition where a first direction alignment film 40X is formed on element substrate 10 using the oblique physical vapor deposition method, FIG. 8E shows a cross-sectional view of an in-line process taken along line VIIIE-VIIIE shown in FIG. 8D.

A second direction alignment film 40Y is formed on the first direction alignment film 40X (the process of forming the second direction alignment film). The second direction alignment film 40Y is in parallel with the Y direction by rotating the substrate body 10a by 90 degrees. The second direction alignment film 40Y which has an alignment property, according to the substrate body 10a, may be obtained along the Y direction.

FIG. 9A shows a plan view of the condition where a second direction alignment film 40Y is formed on the element substrate 10a using the oblique physical vapor deposition method, FIG. 9B shows a cross-sectional view of an in-line process taken along line IXB-IXB shown in FIG. 9A.

Next, a vertical alignment film 42 is formed on the second direction alignment film 40Y (the process of forming the third direction alignment film). The vertical alignment film 42 is formed by an oblique physical vapor deposition of silicon dioxide ($SiO_2$) having an oblique inclination of about 45 to 65 degrees with respect to the normal of the substrate of the element substrate 10, from a degrees (45 degrees with respect to each gap) between a gap between the two adjacent pixel electrodes 15a and 15b and a gap between the two adjacent pixel electrodes 15a and 15c, when being viewed from the top of the substrate body 10a.

FIG. 9C shows a plan view in a state where the vertical alignment film 42 is formed on the substrate body 10a using the oblique physical vapor deposition, and FIG. 9D shows a cross-sectional view of an in-line process taken along line IXD-IXD shown in FIG. 9C.

By using the oblique physical vapor deposition method, the vertical alignment film 42 is not formed in the shadowed area of the pixel electrode 15. In other words, the first direction alignment film 40X and the second direction alignment film 40Y are exposed in an area close to or be contacted with the pixel electrode 15. That is, a horizontal alignment film may be self-adjusted in parallel to the longitudinal direction, with respect to a gap located between the pixel electrodes 15.

In addition, by using the counter substrate 20 including a common electrode 23 covered by the alignment film 29 to be vertically aligned in anti-parallel with the vertical alignment film 42 which is separately formed and covering the common electrode 23, a liquid crystal display device 100 is formed by interposing the liquid crystal layer 50 (see FIGS. 1A and 1B).

Electronic Apparatus

Hereafter, the electronic apparatus including the liquid crystal display device 100 provided with the configuration of the embodiment or including the liquid crystal display device manufactured using the method of the embodiment will be described.

Figure 10A:
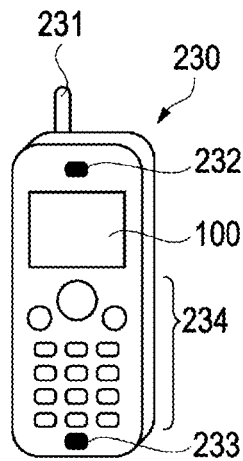
FIGS. 10A to 10F are a schematic diagram for explaining the electronic apparatus.
Figure 10B:
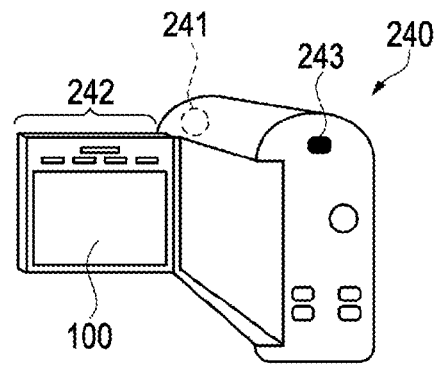
Figure 10C:
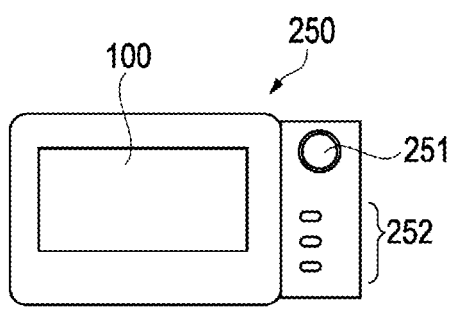

FIGS. 10A to 10C illustrates examples of electronic devices including the liquid crystal display device described above or the liquid crystal display device formed using the manufacturing method of the liquid crystal display device described above. FIG. 10A is a schematic diagram illustrating an example of an application for a mobile phone, and the mobile phone 230 includes an antenna unit 231, a voice output unit 232, voice input unit 233, an operation unit 234, and a liquid crystal display device 100. The liquid crystal display device of the invention as described above may be used as display unit of a mobile phone 230. FIG. 10B is a schematic diagram showing a example of the application for a video camera, the video camera 240 includes a receiver unit 240Y, an operation unit 242, a voice input unit 243, and a liquid crystal display device 100. Such a liquid crystal display device according to the present invention may be used as an electronic viewfinder or display unit. FIG. 10C is a schematic diagram illustrating an example of application for a portable personal computer 250 and the computer 250 includes a camera unit 251, an operation unit 252, and a liquid crystal display device 100. Such a liquid crystal display device according to the present invention may be used as a display unit.

Figure 10D:
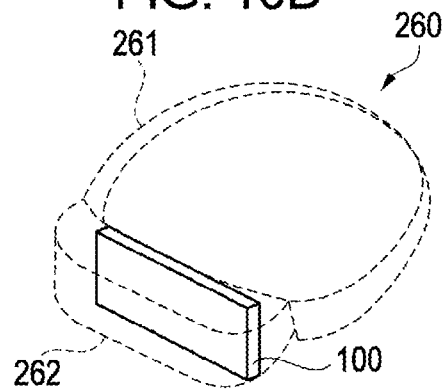
Figure 10E:
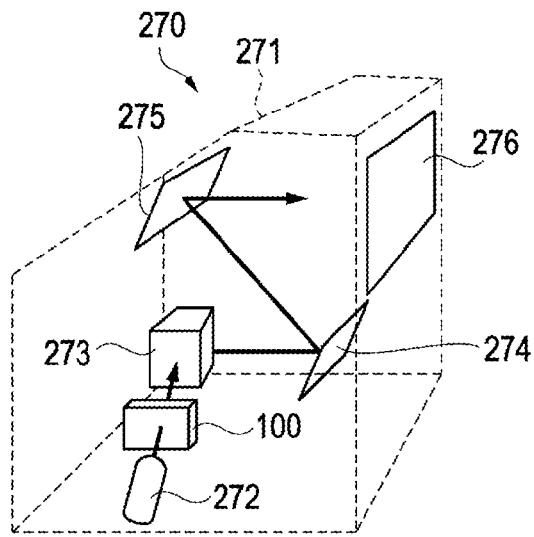
Figure 10F:
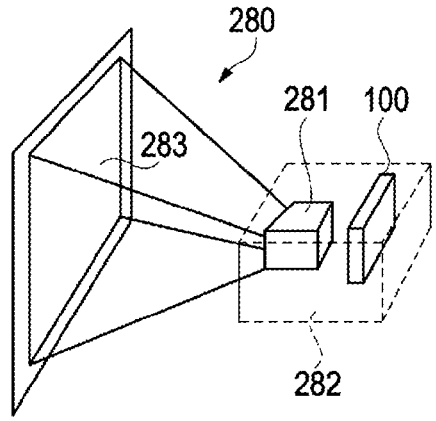

FIG. 10D is a schematic diagram showing an example of an application for a head-mounted display, and the head-mounted display 260 includes a band 261, an optical system housing unit 262 and a liquid crystal display device 100. Such a liquid crystal display device according to the present invention may be used as an image display unit. FIG. 10E is a schematic diagram showing an example of an application of a rear type projector, and the rear type projector 270 includes a housing 271, a light source, a composite optical system 273, a mirror 274, a mirror 275, a screen 276, and a liquid crystal display device 100. Such a liquid crystal display device according to the present invention may be used as an image display unit. FIG. 10F is a schematic diagram showing an example of an application for a front type projector (a mobile mini projector), the projector 280 includes an optical system 281 and a liquid crystal optical device 100 mounted in a housing 282, and an image may be visible on the screen 283. In addition, when working as a mobile mini-projector, when a white wall instead of the screen 283 is used, the screen 283 may be omitted and a mobile mini projector easy to carry may be provided. Such a liquid crystal display device according to the present invention may be used as an image display unit.

The liquid crystal display device according to the invention which is not limited to the above examples may be applied to various electronic devices. For example, a fax machine with a display function, a viewfinder of a digital camera, a portable TV device, a DSP device, a PDA, an electronic notebook, an electronic scoreboard, an advertising display, and the like may be also utilized.

The liquid crystal display device, the manufacturing method the liquid crystal display device, and the electronic apparatus, as described above, may achieve the following advantages.

When using the structure shown in FIG. 6B, the exposure area 40Xa, which horizontally aligns the liquid crystal molecules 115 in the gap between the pixel electrode 15*a* and the pixel electrode 15*b* in the direction along the corresponding gap, is exposed. In addition, the exposure area 40Ya, which horizontally aligns the liquid crystal molecules 115 in the gap between the pixel electrode 15*a* and the pixel electrode 15*c* in the direction along the corresponding gap, is exposed. Thus, the liquid crystal molecules 115, which are located in the gap between the pixel electrode 15*a* and the pixel electrode 15*b*, are horizontally aligned along the longitudinal direction of the corresponding gap. Similarly, the liquid crystal molecules 115, which are located in the gap between the pixel electrode 15*a* and the pixel electrode 15*c*, are horizontally aligned along the longitudinal direction of the corresponding gap. Therefore, it is possible to suppress the occurrence of a phenomenon where the alignment direction of the liquid crystal molecules 115 due to horizontal electric field is aligned in a direction deviated from the longitudinal direction of the corresponding gap. In other words, it is possible to prevent a reduction in contrast due to a disclination and to represent sharp contour by providing the exposure area 40Xa and the exposure area 40Ya.

As shown in the graph of FIG. 7, when comparing the extent of area of the pixel electrode 15*a* (white display area) region in the related art and the embodiment according to the invention, if the white for maximum brightness and the black for minimum brightness are adjacent, the transmissivity is improved by about 25%. Thus, when compared to using the related art, it is possible to express high contrast and sharp contours.

As shown in FIGS. 8D and 8E, since the longitudinal directions of the gaps between two adjacent pixel electrodes 15*a* and 15*c* when being viewed from the top of the substrate body 10*a* are in parallel, and inorganic material is flown and crystals grown at a predetermined angle (80 degrees to 85 degrees for example) with respect to the normal of the element substrate 10, the first direction alignment film 40X, which has the property in the longitudinal direction of the corresponding gap in self-alignment, may be obtained.

As shown in FIGS. 9A and 9B, since the longitudinal directions of the gaps between two adjacent pixel electrodes 15*a* and 15*b* when being viewed from the top of the substrate body 10*a* are in parallel, and inorganic material is flown and crystal grown in a predetermined angle (80 degrees to 85 degrees for example) with respect to the normal of the element substrate 10, the second direction alignment film 40Y, which has the property in the longitudinal direction of the corresponding gap in self-alignment, may be obtained. In addition, in order for the pixel electrode 15 to function as a self-aligned mask, since a second direction alignment film 40Y aligned in the longitudinal direction of the gap between pixel electrodes 15*a* and 15*b* may be obtain by leaving a first direction alignment film 40X aligned in the longitudinal direction of the gap between pixel electrodes 15*a* and 15*c*, it is possible to form the first direction alignment film 40X and the second direction alignment film 40Y aligned in the longitudinal direction between the pixel electrodes 15.

As shown in FIGS. 9C and 9D, by using an oblique physical vapor deposition, a vertical alignment film 42 is not formed in the shadow area of the pixel electrode 15. In other words, the first direction alignment 40X and the second direction alignment film 40Y are exposed in area close to or be in contacted with the pixel electrode 15. That is, it is possible to form a horizontal alignment film in parallel to the longitudinal direction in a self-aligned manner for gap located between the pixel electrodes 15.

Since the common electrode 23 provided with the counter substrate 20 (refer to FIGS. 1A and 1B) and the alignment film 29 covering the common electrode 23 may be used with a (beta) structure not having a pattern, it is possible to facilitate the bonding between the element substrate 10 and the counter substrate 20. In particular, when the element substrate 10 or the counter substrate 20 are large, because precise position adjustment (alignment) is not necessary, liquid crystal display device 100 having a high-contrast may be easily produced and provided.

As described in <Method of Manufacturing a Liquid Crystal Display Device>, since the first direction alignment film 40X and the second direction alignment film 40Y may be formed according to similar conditions, the new investment is not necessary. Therefore, the manufacturing costs are reduced.

As described in <Method of Manufacturing a Liquid Crystal Display Device>, since the first direction alignment film 40X, the second direction alignment film 40Y and the vertical alignment film 42 are manufactured using an oblique physical vapor deposition performing the pixel electrode 15 as a mask, manufacturing without increasing the photolithography processes is possible. Therefore, manufacturing without using an expensive photomask is possible. In addition, if the element substrate 10 is large, alignment of the photomask and the element substrate 10 is difficult, but alignment is not needed due to manufacturing using a self-aligned manner.

In addition, since driving circuits or driving conditions may be treated by the same conditions as the related art, new driving circuits are not needed to be designed and applied. Therefore, without adding a new manufacturing method and manufacturing apparatus, it is possible to form the liquid crystal display device 100 easily.

The present invention is not limited to the embodiments described above, it is possible to make various modifications and improvements to the embodiments described above. The modified example is described below.

Modified Example

The modified example will be explained with reference to FIGS. 4A to 4C.

Herein, although an example in which a first direction alignment film 40X and a second direction alignment film 40Y are disposed on the two sides of the pixel electrode 15 is described, either of them may be disposed in the first pixel electrode 15.

The entire disclosure of Japanese Patent Application No. 2010-228177, filed Oct. 8, 2010 is expressly incorporated by reference herein.

What is claimed is:

1. A liquid crystal display device comprising:
a substrate;
a liquid crystal layer having negative dielectric anisotropy;
a first pixel electrode disposed on the substrate;
a second pixel electrode adjacent to the first pixel electrode in a first direction, the second pixel electrode being disposed on the substrate;
a third pixel electrode adjacent to the first pixel electrode in a second direction intersecting the first direction, the third pixel electrode being disposed on the substrate;
a first alignment film provided in a first gap between the first pixel electrode and the second pixel electrode to align the liquid crystal molecules in the liquid crystal layer along the second direction, the first alignment film being disposed on the substrate;
a second alignment film provided in a second gap between the first pixel electrode and the third pixel electrode to align the liquid crystal molecules in the liquid crystal layer along the first direction, the second alignment film being disposed on the substrate; and
a third alignment film provided in the first gap and the second gap while covering the first pixel electrode, the second pixel electrode, and the third pixel electrode to align the liquid crystal molecules along a normal direction of the substrate,
wherein a portion in which a portion of the first alignment film disposed between the first pixel electrode and the second pixel electrode is in contact with the liquid crystal and a portion of the third alignment film disposed between the first pixel electrode and the second pixel electrode is in contact with the liquid crystal, and
a portion of the second alignment film disposed between the first pixel electrode and the third pixel electrode is in contact with the liquid crystal and a portion of the third alignment film disposed between the first pixel electrode and the third pixel electrode is in contact with the liquid crystal.

2. The liquid crystal display device according to claim 1, wherein the first alignment film is a first inorganic alignment film,
the second alignment film is a second inorganic alignment film, and
the third alignment film is a third inorganic alignment film.

3. The liquid crystal display device according to claim 1, wherein the third alignment film is disposed on the pixel electrode to cover the first alignment film and the second alignment film.

4. An electronic apparatus comprising the liquid crystal display device according to claim 1.

5. A liquid crystal device comprising:
a first substrate;
a liquid crystal layer having negative dielectric anisotropy;
a second substrate that opposes to the first substrate via the liquid crystal layer;
a first pixel electrode disposed on the first substrate;
a second pixel electrode that is disposed adjacent to the first pixel electrode, the first pixel electrode and the second pixel electrode arranged along a first direction, the second pixel electrode being disposed on the first substrate;
a third pixel electrode that is disposed adjacent to the first pixel electrode, the first pixel electrode and the third pixel electrode arranged along a second direction, the second direction intersecting with the first direction, the third pixel electrode being disposed on the first substrate;
a first alignment film that aligns a first liquid crystal molecule included in the liquid crystal layer along to the second direction, the first alignment film being disposed between the first pixel electrode and the second pixel electrode, the first alignment film being disposed on the first substrate;
a second alignment film that aligns a second liquid crystal molecule included in the liquid crystal layer along to the first direction, the second alignment film being disposed between the first pixel electrode and the third pixel electrode, the second alignment film being disposed on the first substrate; and
a third alignment film that aligns a third liquid crystal molecule in the liquid crystal layer along to a direction from the first substrate to the second substrate, the third alignment film covering the first pixel electrode, the second pixel electrode, the third pixel electrode, a first portion between the first pixel electrode and the second pixel electrode, and a second portion between the first pixel electrode and the third pixel electrode, the third alignment film being disposed on the first substrate,
the first alignment film and the third alignment film contacting with the liquid crystal layer at a portion between the first pixel electrode and the second pixel electrode,
the second alignment film and the third alignment film contacting with the liquid crystal layer at a portion between the first pixel electrode and the third pixel electrode.

6. A liquid crystal device comprising:
a substrate
a first pixel electrode disposed on the substrate;
a second pixel electrode that is disposed adjacent to the first pixel electrode, the first pixel electrode and the second pixel electrode arranged along a first direction, the second pixel electrode being disposed on the substrate;

a third pixel electrode that is disposed adjacent to the first pixel electrode, the first pixel electrode and the third pixel electrode arranged along a second direction, the second direction intersecting with the first direction, the third pixel electrode being disposed on the substrate;

a first alignment film that aligns a first liquid crystal molecule along to the second direction, the first alignment film being disposed between the first pixel electrode and the second pixel electrode, the first alignment film being disposed on the substrate;

a second alignment film that aligns a second liquid crystal molecule along to the first direction, the second alignment film being disposed between the first pixel electrode and the third pixel electrode, the second alignment film being disposed on the substrate; and a third alignment film that aligns a third liquid crystal molecule along to a direction from the substrate to an opposite substrate, the third alignment film covering the first pixel electrode, the second pixel electrode, the third pixel electrode, a first portion between the first pixel electrode and the second pixel electrode, and a second portion between the first pixel electrode and the third pixel electrode, the third alignment film being disposed on the substrate, the first alignment film and the third alignment film being capable of contacting with a liquid crystal layer at a portion between the first pixel electrode and the second pixel electrode, the second alignment film and the third alignment film being capable of contacting with the liquid crystal layer at a portion between the first pixel electrode and the third pixel electrode.

* * * * *